United States Patent [19]

Anscherlik

[11] Patent Number: 4,630,753
[45] Date of Patent: Dec. 23, 1986

[54] DEVICE FOR DISPENSING DOSES OF LIQUID

[76] Inventor: Arnost Anscherlik, Schwarzenbergerstrasse 1, 8134 Adliswil, Switzerland

[21] Appl. No.: 705,435
[22] PCT Filed: Jun. 4, 1984
[86] PCT No.: PCT/CH84/00089
  § 371 Date: Jan. 25, 1985
  § 102(e) Date: Jan. 25, 1985
[87] PCT Pub. No.: WO84/04964
  PCT Pub. Date: Dec. 20, 1984

[30] Foreign Application Priority Data

Jun. 7, 1983 [CH] Switzerland .................. 3107/83
Jun. 16, 1983 [CH] Switzerland .................. 3295/83

[51] Int. Cl.$^4$ .......................................... B67D 5/30
[52] U.S. Cl. .................................. 222/17; 222/52; 222/61; 222/64; 222/399; 422/100
[58] Field of Search ............... 222/61, 64, 394, 14, 222/16, 17, 52, 65, 71, 397, 399; 422/75, 81, 100, 310

[56] References Cited

U.S. PATENT DOCUMENTS 3,085,717  4/1963  Anscherlik ................ 422/100 X
3,186,808  6/1965  Anscherlik ................ 422/100
3,435,989  4/1969  Lorenzen ................... 222/61 X
3,718,438  2/1973  Anscherlik ................ 422/100
4,143,793  3/1979  McMillin et al. .......... 222/61 X

FOREIGN PATENT DOCUMENTS

1642956  6/1971  Fed. Rep. of Germany .
967436  8/1964  United Kingdom .

Primary Examiner—Joseph J. Rolla
Assistant Examiner—Jay I. Alexander
Attorney, Agent, or Firm—Gerald J. Ferguson, Jr.; Michael P. Hoffman; Ronni S. Malamud

[57] ABSTRACT

A liquid dispensing device for an automatic chemical analyzer or for other chemical apparatus. A dispensing tank is located inside a filling bulb. The dispensing tank has an inlet opening and becomes narrower above the inlet opening to form a vent. The dispensing tank is filled with the dosed liquid by an overpressure from a reservoir which is placed beneath the dispensing tank. The dosed liquid is pushed out from the dispensing tank through a dispensing pipe by regulated overpressure. A regulation tank, a filling bulb, and an isolation pipe isolate the liquid dispensing device from the reservoir and enable the dosing of liquid from a flow channel; or from a large tank, or from a pipe under pressure. A new construction of an air distributor with one nozzle controls the air flow in the liquid dispensing device. The air distributor may control one or more dosing devices.

24 Claims, 9 Drawing Figures

DEVICE FOR DISPENSING DOSES OF LIQUID

The invention relates to a device for dispensing doses of liquid, from which doses of liquid are dipensed by means of a pneumatic effect.

Growing technical demands in process automation, in the chemical and related industries, and in machine construction have resulted in the development of a number of devices which dispense doses of liquid by means of a pneumatic effect. These devices are simple, accurate, and have a low susceptibility to technical trouble.

Known devices for dispensing doses often require complex apparatuses for stabilising the internal liquid level, sometimes have to be hand filled with the liquid which is to be dispensed before being used for the first time and/or when switched on after a long period of not having been used, and bubbles are often formed when these devices are filled which impair the dispensing accuracy and operation. The reservoirs of liquids are often limited in size and cannot usually be fitted underneath these devices. The regulation of the liquid level of the reservoirs often requires complex apparatuses.

The air distributors necessary for dispensing devices require various apparatuses for distributing the auxiliary pressure means. Electromagnetic, pneumatic, and otherwise powered systems, such as valves, cam plates and similar devices, are generally used for this purpose. These devices include a relatively large number of mechanical parts, seals etc. which become worn comparatively quickly and thus susceptible to failure, and which are difficult to maintain and cost intensive. The multiplicity of individual mechanical parts required for known distributor systems also has a bearing on the dimensions of these devices.

The object of the invention is to overcome the aforesaid disadvantages.

According to the invention this is achieved by way of the procedures in the appropriate parts of claims 1 to 24.

The essence of the invention is described in more detail below with the aid of the schematic embodiments in the drawings wherein.

Figure 1:
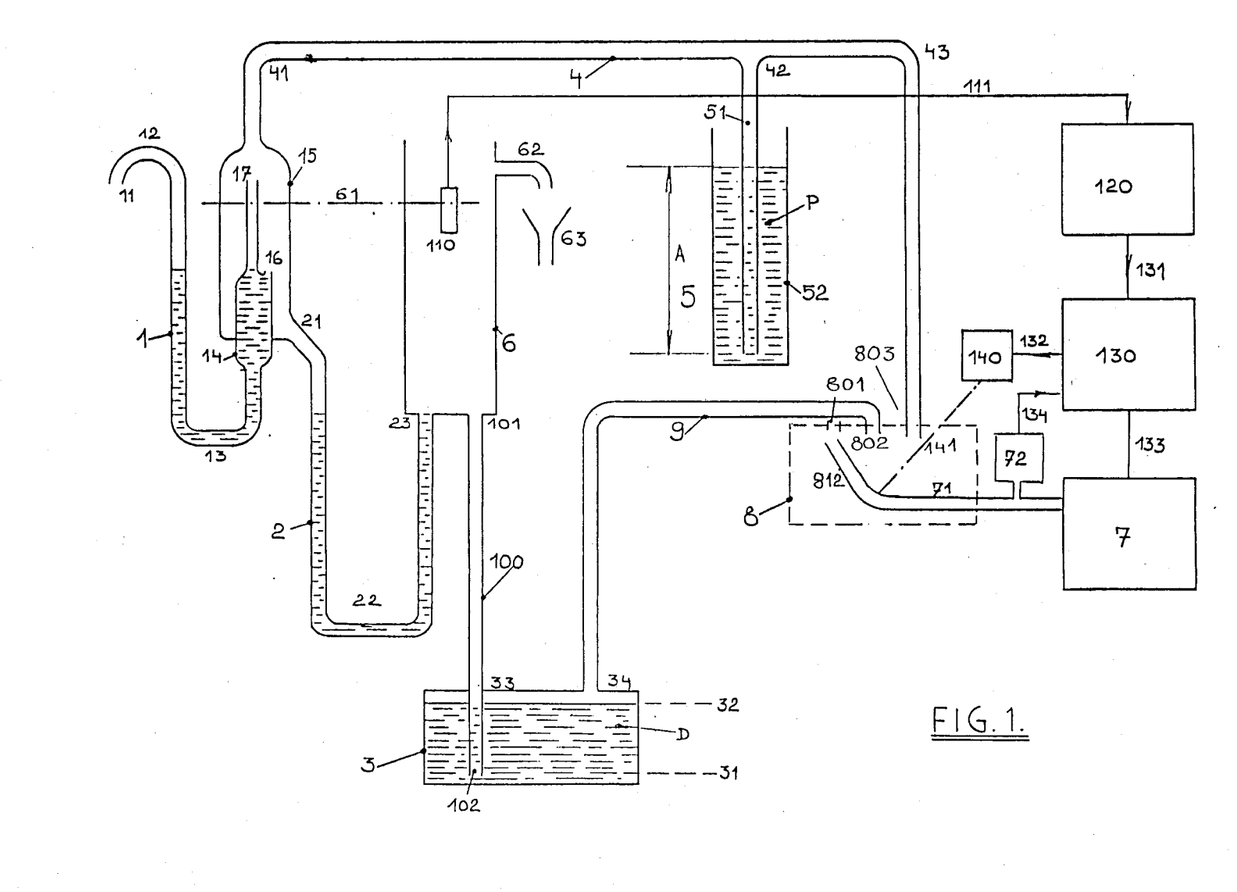
FIG. 1: shows an overall schematic view of the dispensing device.

The shown dispensing device consists of a dispensing pipe 1 having a bend 12 at the top, an opening 11 into the atmosphere, and a bend 13 at the bottom. Above the lower bend 13 a dispensing tank 14 is arranged on the opposite side to the opening 11, in such a way that it lies below the opening 11. The volume of the dispensing tank 14 determines the quantity dispensed by the dispensing device. The dispensing tank 14 has an inlet opening 16 and becomes narrower above this inlet opening 16 to form a vent 17. The dispensing tank 14 and its vent 17 are located within a filling bulb 15. At its lower end the filling bulb 15 is connected to the inlet pipe 2 by means of the inlet opening 21. The inlet pipe 2 has a bend 22 at the bottom and opens into the bottom of the regulation tank 6 by way of its connection piece 23. The regulation tank is arranged in such a way that its bottom is below the inlet opening 21. The lower bend 22 of the inlet pipe 2 is arranged so low down that the liquid in the inlet pipe 2 forms a liquid barrier for the maximum overpressure which is needed in the dispensing device. In addition the upper end 101 of a supply pipe 100 is attached to the bottom of the regulation tank 6 at the top of which an overflow 62 is fitted opening into the drainage system 63. The intake of the overflow 62 is arranged in such a way that it is below the upper bend 12 of the dispensing pipe 1. The liquid level in the regulation tank 6 is controlled, and for this purpose there is a level indicator 110 at the controlled liquid level 61.

The controlled liquid level 61 is below the upper bend 12 of dispensing pipe 1, below the opening of the vent pipe 17, below the overflow 62, below the branch 41 of the connection pipe 4 and above the intake opening 16 of the dispensing pipe 1. The supply pipe 100 enters the reservoir 3 of the dispensing liquid D which lies below the level of the bottom of the regulation tank 6 through the sealed connection 33. The reservoir 3 must only be filled with the dispensing liquid D as far as the upper surface level 32. The lower part 102 of the supply pipe 100 lies below the lower surface level 31 of the dispensing liquid D. The compressed air connection 34 at the top of the reservoir 3 is connected to the outlet 802 of the air distributor 8 by means of a compressed air pipe 9. The outlet 801 of the air distributor 8 opens into the free atmosphere, the outlet 803 is connected to the branch 43 of the connection pipe 4. The branch 42 of the connection pipe 4 is connected to the submerged pipe 51 of an overpressure regulator 5. The overpressure regulator 5 consists, in one possible embodiment, of an open tank 52, filled with an auxiliary liquid P, and a submerged pipe 51 with a submerged depth A. The connection pipe 4 is connected to the upper part of the filling bulb 15 via branch 41. The distribution of compressed air which is necessary for the operation of the dispensing device is brought about with the aid of the distributor nozzle 812 of the air distributor 8 which is connected to the source of compressed air 7 by means of feed pipe 71. In addition, the feed pipe 71 is connected to the pressure indicator 72 from which a signal line 134 leads to the control unit 130.

The distributor nozzle 812 of the air distributor 8 is moved by means of the drive 140 via the coupling 141. The control unit 130 of the complete dispensing device controls the drive 140 via control line 132 and the compressed air source 7 via control line 133. The level indicator 110 is connected to the control unit 130 by means of a control line 111 via the measuring transducer 120 and line 131.

The dispensing device in the embodiment according to FIG. 1 operates as follows:

Before initial use, the dispensing pipe 1, the inlet pipe 2 and the regulator tank 6 are empty. The reservoir 3 and the overpressure regulator 5 are filled with the appropriate liquid (D or P). At the start all the internal spaces of the dispensing pipe 1, the filling bulb 15, the inlet pipe 2, the connection pipe 4 and also the space above the dispensing liquid D are connected to the atmosphere, partly directly and partly via the air distributor 8.

After the dispensing device has been switched on, the distributor nozzle 812 of the air distributor 8 is positioned opposite outlet 802 by the control unit 130 by means of drive 140 via coupling 141. After positioning the distributor nozzle 812, the control unit 130 switches on the compressed air source. The overpressure produced by the compressed air source 7 now enters the space above the dispensing liquid D by way of inlet 71, the distributor nozzle 812, the outlet 802, the compressed air pipe 9 and the compressed air connection 34 of the reservoir 3.

The source of compressed air 7 delivers the overpressure in such an area that when the level of liquid D in reservoir 3 lies between the upper surface level 32 and the lower surface level 31, a safe filling of the dispensing device to the level of the regulated liquid level 61 is guaranteed.

The overpressure necessary for conveying the liquid D from the reservoir 3 to the regulated liquid level 61 is inversely proportional to the liquid level in reservoir 3. This fact is used for checking the liquid level in reservoir 3 with the aid of the pressure indicator 72.

When the reservoir 3 is empty and/or the level is below the lower surface level 31, the overpressure delivered falls practically to zero which can, by means of pressure indicator 72, be used to raise the alarm.

The overpressure forces the liquid D out of the reservoir 3 and into the regulation tank 6 via supply pipe 100. The regulation tank 6 and the filling bulb 15 which is connected to it by means of inlet pipe 2, are filled with liquid D. When the level of liquid D in the filling bulb 15 has reached the level of the inlet opening 16 of the dispensing tank 14, the dispensing tank 14 and therefore the dispensing pipe 1 are also filled. The liquid D flowing into the dispensing tank 14 forces the air inside the dispensing tank 14 partly through the dispensing pipe 1 and into the opening 11, and partly through the vent pipe 17, the branch 41, the connection pipe 4 and the outlets 803 and 801 of the air distributor 8, into the free atmosphere. This eliminates the formation of air bubbles.

The filling process lasts until the level of liquid D in the regulation tank 6, in filling bulb 15 and dispensing pipe 1 with its parts (dispensing tank 14, vent pipe 17) has reached the regulated liquid level 61.

When the liquid level 61 has been reached, the control unit 130 is activated by the level indicator 110 via the signal line 111, the measuring transducer 120 and the line 131, in such a way that the control unit 130 switches off the compressed air source 7 via the control line 133, and then controls the drive 140 via the control line 132, so that the distributor nozzle 812 of the air distributor 8 takes up a position which connects the outlets 802 and 803 with the free atmosphere via outlet 801. This allows the air which has been compressed during the filling process in the compressed air pipe 9 and reservoir 3, to escape into the free atmosphere. This results in a reflux of liquid D from the regulation tank 6, the filling bulb 15, the vent pipe 17, the dispensing pipe 1 and the inlet pipe 2 into the reservoir 3.

The dispensing tank 14 remains filled to the level of the inlet opening 16 after the filling bulb 15 is completely emptied, this also being the case for the other side of dispensing pipe 1.

Once the regulation tank 6 is completely empty, the inlet pipe 2 remains filled with liquid D to the level of the opening of its connection piece 23 into the regulation tank, which forms the liquid barrier necessary for the further functioning of the dispensing device.

After the automatic stabilization of the internal liquid level as described above, the distributor nozzle 812 of the air distributor 8 is positioned opposite outlet 803. The compressed air source is then switched on. Thus the compressed air produced by the compressed air source 7 enters the connection pipe 4 through inlet 71, the distributor nozzle 812 and the outlet 803. The compressed air enters the submerged pipe 51 of the overpressure regulator 5 through branch 42 of the connection pipe 4 and the air pressure therein reaches sufficient magnitude such that the air will bubble from the end of the submerged pipe 51 through the auxiliary liquid "p" into the atmosphere, such that pressure in the inside of the filling bulb 15 and the connection pipe 4 is automatically regulated. The action of the overpressure regulator 5 brings about a regulated overpressure, the value of which is given by the submerged depth A of the submerged pipe 51 and by the specific gravity of auxilliary liquid P. Embodiments of the overpressure regulator can include a membrane regulator, a floating regulator etc.

By way of branch 41 of the connection pipe 4, the regulated overpressure acts on the the liquid D in the dispensing tank 14 of the dispensing pipe 1, and also on the liquid in the inlet pipe 2, which forms a liquid barrier for the overpressure. This forces a certain quantity of the collected liquid D out of the dispensing tank 14 via the opening 11 of the dispensing pipe 1. The desired amount of liquid D forced out is determined by the volume of the dispensing tank 14 and by the adjusted regulated overpressure.

Figure 2:
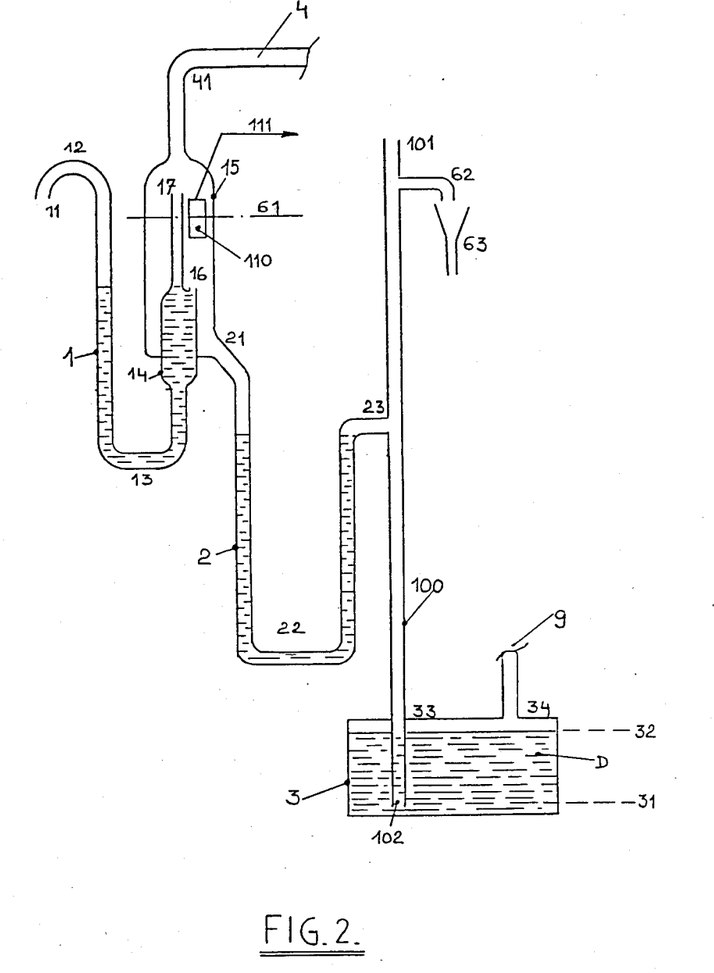
FIG. 2: shows an embodiment of the dispensing device with a level indicator built into the filling tank.

FIG. 2 shows an embodiment of the dispensing device in which the level indicator 110 is fitted directly in the filling bulb 15. In this embodiment the connection piece 23 of the inlet pipe 2 is connected directly to the supply pipe 100 as a branch, the connecting piece 23 being placed below inlet opening 21 and the upper part 101 of the supply pipe 100 lying above the regulated liquid level 61 and being fitted with an overflow 62. The dispensing device according to FIG. 2 operates identically to the device according to FIG. 1.

Figure 3:
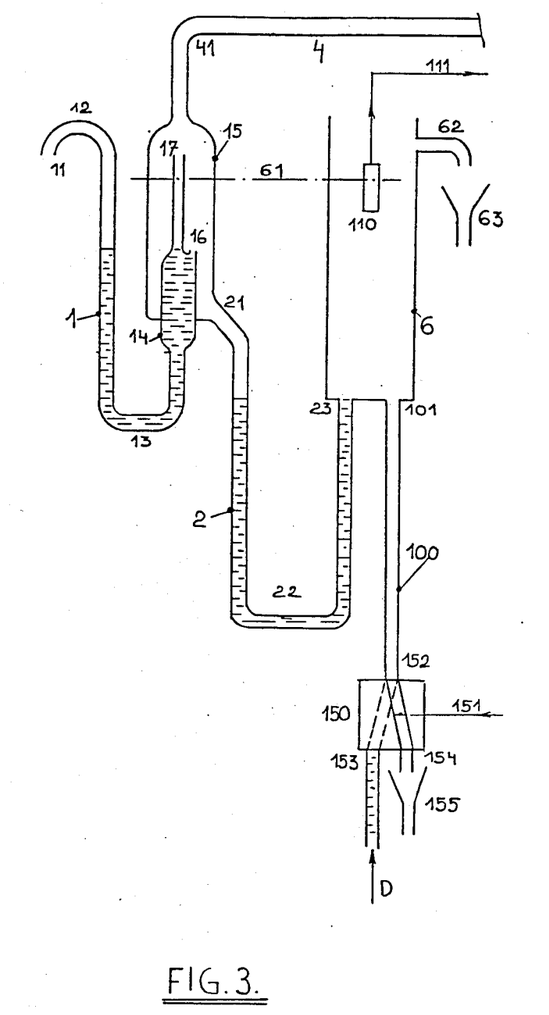
FIG. 3: shows the dispensing device with a liquid reversal switch.

FIG. 3 shows an alternative embodiment of the dispensing device with extraction of the dispensing liquid D from a pressurised pipeline. In this alternative the regulation tank 6 is filled with the aid of a liquid reversal switch 150 which is connected to the control unit 130 by means of a control line 151. The liquid reversal switch 150 has an outlet 152, connected to the supply pipe 100, an inlet 153, connected to the pressurised pipeline containing the liquid D, and the outlet 154 which opens into the discharge 155. In this embodiment of the dispensing device as compared to the embodiment according to FIG. 1, the reservoir 3, the pressurised air line 9 and the outlet 802 of the air distributor 8 are missing. Except for the filling of the regulation tank 6 by means of overpressure of the compressed air source 7, the dispensing device operates identically to the dispensing device according to FIG. 1. The regulation tank 6 and/or the whole dispensing device is filled directly from the pressure line via the liquid reversal switch 150, if the control unit 130 controls the reverser 150 via the control line 151 so that the path between inlet 153 and outlet 152 is open. The path remains open until the filling process is complete and the level of the regulated liquid level 61 has been reached. After having been activated by the level indicator 110, the control unit 130 gives a control command to the liquid reversal switch 150, so that the path from outlet 152 to outlet 154 is now open and the liquid D can flow out of the dispensing device. Following the automatic stabilization of the inner liquid level, as described, the dispensing device according to FIG. 3 operates absolutely identically to the dispensing device according to FIG. 1.

Figure 4:
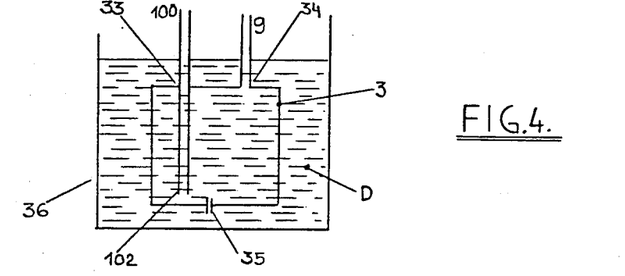
FIG. 4: shows the modified reservoir of dispensing liquid for extraction from a flow channel or a tank.

FIG. 4 shows a modified reservoir 3, which permits the dispensing liquid D to be extracted from a flow channel or a larger tank 36. At the bottom of the reservoir 3 there is a filling means, which in this example is formed through an opening 35, which allows the dispensing liquid D to enter the reservoir 3. The dimensions of the opening 35 and the submerged depth of the reservoir 3 are selected so that perfect functioning is ensured when the dispensing device is filled as described above.

Figure 5:
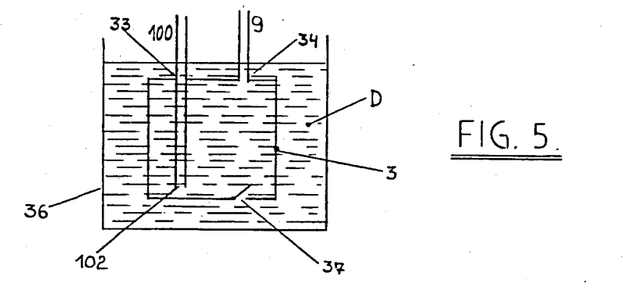
FIG. 5: shows a variant of the modified reservoir with a reflux valve and/or flap trap.

FIG. 5 shows a variant of the modified reservoir 3, according to FIG. 4, which has a filling means which is formed in this example through a reflux valve (flap-trap) 37 instead of an opening 35, as described together with FIG. 4.

Figure 6:
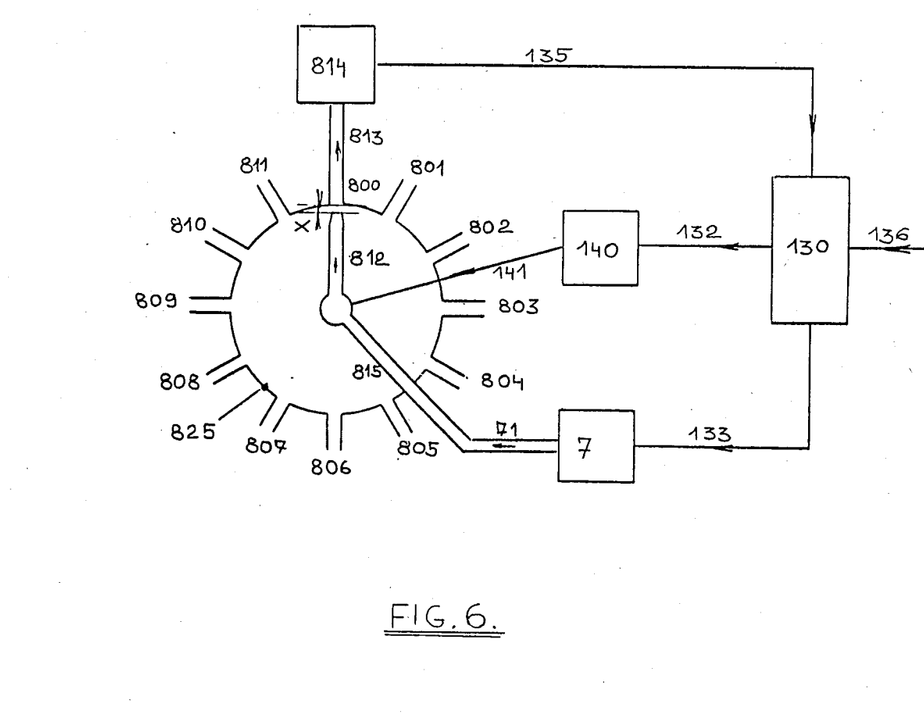
FIG. 6: shows a schematic overall view of an air distributor.
Figure 7:
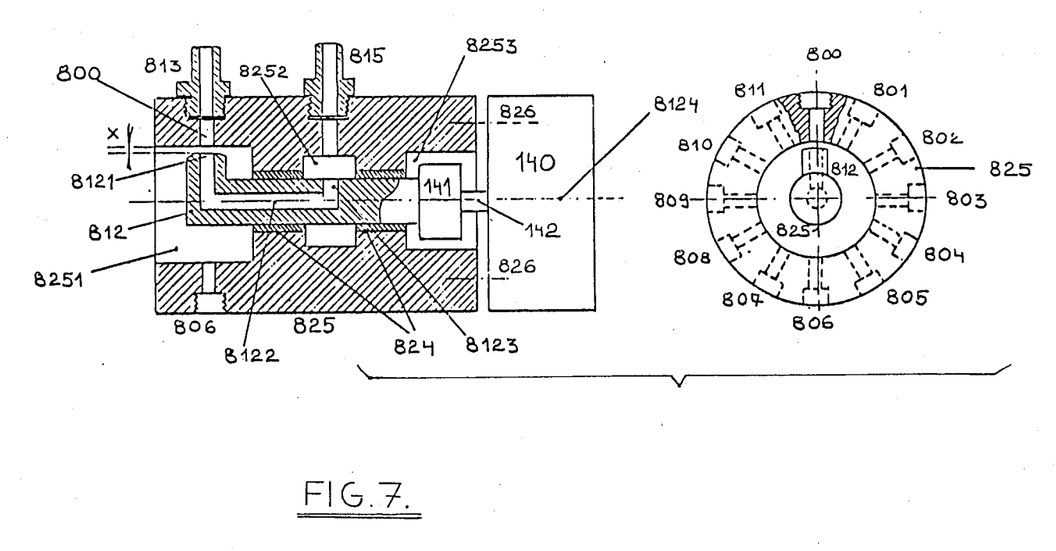
FIG. 7: shows an example of the design of the actual distributor with a rotating distributor nozzle.

In FIGS. 6 and 7 the air distributor consists of a stator 825 with a reference channel 800 and symmetrically arranged outlets 801 to 811. In the distribution chamber 8251 of the stator 825 which opens into the atmosphere, there is a rotating mobile distributor nozzle 812.

The distributor nozzle 812 is connected in the coupling chamber 8253 of the stator 825 to the shaft 142 of the drive 140 by means of a coupling 141. The drive 140 is connected mechanically to the stator 825 by the fastening element 826.

The reference channel 800 is connected to the indicator of the reference point 814 with the aid of connection pipe 813. Outlets 801 to 811 of the air distributor 8 are connected to those points where the compressed air is required for distribution.

The distributor nozzle 812 has a through channel 8122 with an inlet opening 8123 and opening 8121. The cavity 8252 is connected to the compressed air source 7 by means of outlet 815 of the air distributor 8 and inlet 71.

The inlet opening 8123 of the rotating mobile distributor nozzle 812 and the cavity 8252 are sealed against the other cavities of the stator 825 with seals 824. Opening 8121 of the distributor nozzle 812 is arranged in such a way that middle points of the openings of the reference channel 800 and outlets 801 to 811 of the air distributor 8 lie in the same plane as the axis through the middle point of opening 8121 vertically to the rotational axis 8124 of the distributor nozzle 812. The distance X between the upper surface of the distribution chamber 8251 and the opening 8121 of the distributor nozzle 812 is determined by the permitted loss of pressure.

The indicator of the reference point 814, for example, in an embodiment as a pressure transducer or microphone, directs a signal to the control unit 130 along signal line 135. Control unit 130 controls the drive 140 via the control line 132, and the compressed air source 7 via control line 133. The function of the control unit 130 can be determined by possible overriding systems via the control inlet 136.

Figure 8:
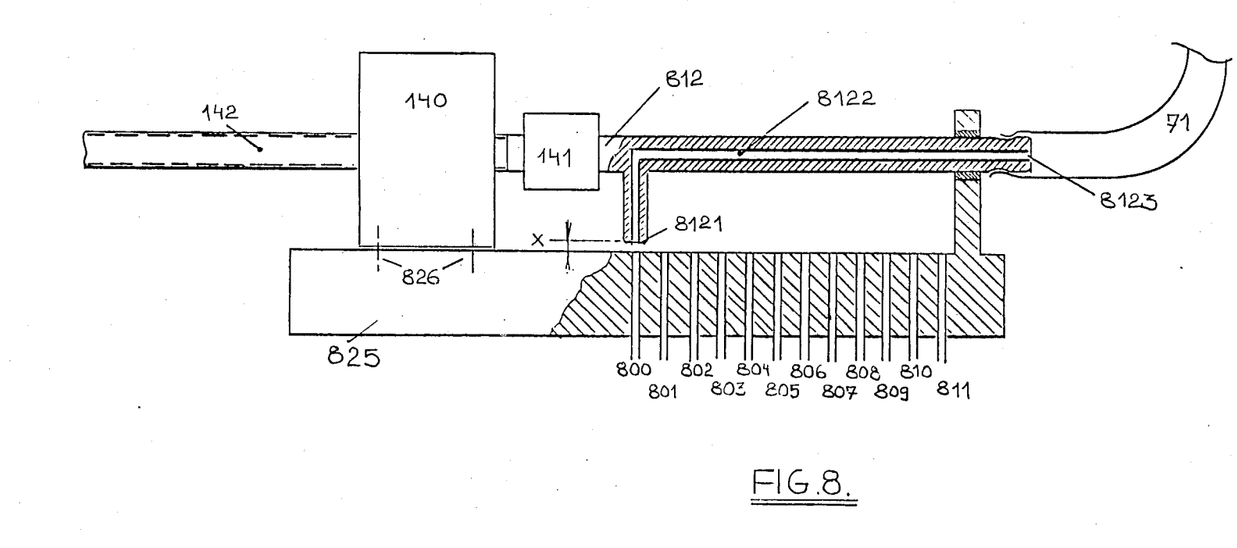
FIG. 8: shows an example of the distributor with a distributor nozzle which moves in a linear direction.

FIG. 8 shows a variant of the distributor in an embodiment with a distributor nozzle 812 which moves in a linear direction. In this variant the drive 140 is designed so that the shaft 142 executes a linear movement. In this case the upper surface of the stator 825 which is turned towards the distributor nozzle 812 is flat. The opening of the reference channel 800, of the outlets 801 to 811 of the air distributor 8 and the opening 8121 of the distributor nozzle 812 are at a distance of X from each other. In this case the distributor nozzle 812 is connected directly to the compressed air source 7 by means of a flexible inlet pipe 71.

Figure 9:
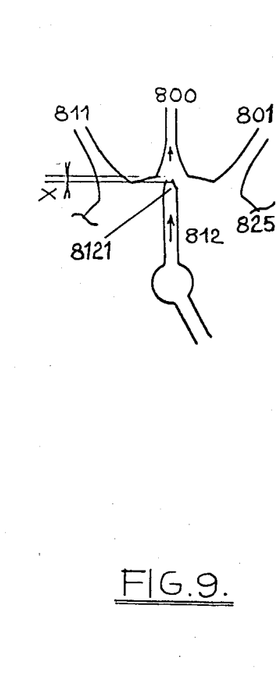
FIG. 9: shows a design variant of the distributor nozzle and extraction channel with an ejector effect.

FIG. 9 shows a possible embodiment of the distributor nozzle 812 and outlets 801 to 811 of air distributor 8 with conical openings.

The distributor according to FIGS. 6 and 7 operates as follows:

When the distributor is switched on, or when required, the drive 140 and the compressed air source 7 are switched on. In this starting cycle the compressed air source 7 is controlled in such a way that it only delivers sufficient pressure to activate the indicator of the reference point 814 and has no effect on the points to be connected to outlets 801 to 811 of the air distributor 8. After having been switched on, the distributor nozzle 812 is put into motion via shaft 142 and coupling 141. When the opening 8121 of the distributor nozzle 812 reaches the position of the opening of the reference channel 800 and the indicator of the reference point 814 recognizes the pressure signal, a signal is given by the latter to the control unit 130 via the signal line 135. The control unit 130 thereby stops the drive 140 so that the opening 8121 of the distributor nozzle 812 comes to a halt opposite the opening of the reference channel 800, at the same time the compressed air source 7 is switched off. By means of this starting cycle a clear basis for further functions of the distributor is defined. The desired distribution is achieved as follows: firstly positioning of the distributor nozzle 812 to the appropriate outlet 801 to 811 of the air distributor 8 occurs by means of a movement of the drive 140 which receives its control commands from the control unit 130 via the control line 132. Only when the desired position has been reached is the compressed air source 7 switched on by the control unit 130 via control line 133, and the introduction of compressed air into one of outlets 801 to 811 of the air distributor 8 determined by the control unit 130 begins. The remaining outlets of the air distributor 8 are connected to the atmosphere.

The distributor in the embodiment according to FIG. 8 operates identically to the embodiment described above according to FIGS. 6 and 7, with the exception that the distributor nozzle 812 executes a linear movement instead of a rotating one.

In the embodiment of the distributor nozzle 812, the opening 8121 of said nozzle is constricted and the reference channel 800 of the outlets 801 to 811 have a conical form with greater diameter opposite the constricted opening 8121. This construction enables the whole stream of the distributed air to flow in the reference channel 800 and outlets 801 to 811 and said construction thus forms an air ejector. In this variant, a well-known suction effect occurs which counteracts the loss of the distributing medium. In this construction, the distance between opening 8121 of the distributor nozzle 812 and the surface of the stator 825 of the air distributor 8 is X.

The level indicator described in the examples can operate on various principles such as, for instance, with a float, photoelectrically, on the principle of electric conductivity, capacity, determination of the dielectric constant, with a thermistor etc.

The compressed air source can operate according to any principle, as long as it is controllable.

The above examples show the embodiments with a reference channel and eleven outlets of the air distributor. Embodiments with any number of channels are possible.

The indicator of the reference point of the air distributor can also operate on another principle, such as photoelectrically, magnetically, mechanically etc.

The air distributor, as described, can also be designed with valves, flaps, cams, slides etc. or as a motorised air distributor. Step motors and all other known drive systems can be used to move the distributor nozzle of the air distributor, but they must send an acknowledgement message regarding their shaft position back to the control unit.

The dispensing device according to the invention is characterised in that the inner liquid level is automatically and independently adjusted, which allows an accurate dosage to be dispensed from the liquid in the reservoir irrespective of variations in the surface level.

Due to the method of filling, and the design of the dispensing tank, the formation of air bubbles is prevented thus making the accurate dispensing of the smallest dosages possible.

The dispensing device operates reliably from the time it is first switched on, without the need for the inner parts to be filled manually first.

The reservoir of dispensing liquid is situated below the dispensing device and can therefore be of a larger size.

The level of the liquid in the reservoir can be monitored automatically during each dispensing cycle by simple air pressure measurements.

The dispensing device also makes it possible to dispense liquid from larger receptacles, flow channels and pressurised pipelines.

The device according to the invention is used in the chemical and related fields, in the construction of various apparatuses, chemical analyzers, filling machines etc.

I claim:

1. Device for dispensing doses of liquids by means of which a liquid is released by pneumatic action, characterised in that a dispensing pipe (1) with a dispensing tank (14) which is situated in a filling bulb (15), has an inlet opening (16) and a vent pipe (17) at the top of said tank, and in that the filling bulb (15) is connected at the bottom thereof to a regulation tank (6) with a regulated liquid level (61) by means of an inlet pipe (2); a level indicator (110) of the regulated liquid level (61) situated in the regulation tank (6) being connected to a control unit (130) via a signal line (111), a measuring transducer (120), and a further line (131), the control unit (130) being connected to a compressed air source (7) via a control line (133), this compressed air source (7) being connected via an inlet (71), an air distributor (8), and a compressed air line (9) to a reservoir (3), which opens into the regulation tank (6) by means of a supply pipe (100); the control unit (130) also being connected via a control line (132) to a drive (140), the drive (140) being connected to a distributor nozzle (812) of the air distributor (8) by means of a coupling (141), the air distributor (8) opening into the atmosphere via an outlet (801), another outlet (802) of the distributor being connected to the compressed air line (9), and a further outlet (803) of the distributor connected to a connection pipe (4), which is connected via a branch (42) to a submerged pipe (51) of an overpressure regulator (5), and via another branch (41) to the filling bulb (15).

2. Device for dispensing doses of liquid according to claim 1, characterised in that the dispensing tank (14) with a completely open upper part is situated in the filling bulb (15), the upper part of the dispensing tank (14) forming both the vent pipe (17) and the inlet opening (16), and this upper part of the dispensing tank (14) lying below the regulated liquid level (61).

3. Device for dispensing doses of liquid according to claim 1 characterised in that the level indicator (110) is fitted in the filling bulb (15), the supply pipe (100) leading to the reservoir (3) being equipped with an overflow (62) and an upper part (101) of the supply pipe opening into the atmosphere, an inlet pipe (2) being connected to the supply pipe (100).

4. Device for dispensing doses of liquid according to claim 1 characterised in that the reservoir (3) is submersed in dispensed liquid (D) and has a filling means.

5. Device for dispensing doses of liquid according to claim 1 characterised in that a pressure indicator (72) is connected to the inlet (71), which is connected to the control unit (130) via a signal line (134).

6. Device for dispensing doses of liquid according to claim 1 characterised in that the supply pipe (100) is connected to a flow reversal switch (150) which is connected to the control unit (130) via a control line (151).

7. Device for dispensing doses of liquid according to claim 1 characterised in that the distributor nozzle (812) of the air distributor (8) comprises an inlet opening (8123), a flow channel (8122) and an outlet opening (8121), and is moveably fitted in a stator (825) comprising a reference channel (800) and a plurality of outlets (801) to (811), such that the opening (8121) of the distributor nozzle (812) is at a distance (X) from an upper surface of a distributor chamber (8251) of the stator (825), the distributor nozzle (812) being connected via a sealed cavity (8252) of the stator (825) and the inlet (71) to the compressed air source (7), the distributor nozzle (812) being connected by means of the coupling (141) to a shaft (142) of the drive (140), which is controlled by the control unit (130); the control unit (130) also controlling the compressed air source (7).

8. Device for dispensing doses of liquid according to claim 1 characterised in that the distributor nozzle (812) of the air distributor (8) moves linearly with an inlet opening (8123), a flow channel (8122) and an opening (8121) is moveably fitted against a stator (825) comprising a reference channel (800) and outlets (801) to (811), in such a way that the opening (8121) of the distributor nozzle (812) is at a distance (X) from the stator (825), the distributor nozzle (812) being connected to the compressed air source (7) by means of a flexible inlet pipe (71), the distributor nozzle (812) being connected via the coupling (141) to a shaft (142) of the drive (140), which is controlled by the control unit (130), the control (130) unit also controlling the compressed air source (7).

9. Device for dispensing doses of liquid according to claim 1 characterised in that the air distributor (8) comprises a reference channel (800), and is connected to the control unit (130) by means of a reference point indicator (814) and a signal line (135).

10. Device for dispensing doses of liquid according to claim 1 characterised in that the distributor nozzle (812)

is connected by means of the coupling (141) to a shaft of the drive (140), which has a system for acknowledging its shaft position, which is connected to the control unit (130).

11. Device for dispensing doses of liquid according to claim 1 characterised in that the distributor nozzle (812) of the air distributor (8) comprises an opening (8121) and a plurality of outlets (801) to (811) of the air distributor (8) said opening and outlets forming air ejectors.

12. A device as in claim 1 where said compressed air source includes the air distributor having a plurality of outlet ports adapted for respective connection to a plurality of said dispensing devices.

13. A pneumatic dosing device comprising
a dispensing tank for containing a liquid, said tank having (a) a vent tube extending from an upper portion of the tank where the vent tube includes an opening disposed above a predetermined level above the upper portion of the tank, (b) an inlet opening in said upper portion of the tank, and (c) a dispensing tube extending from a lower portion of the tank to at least a predetermined level; and
a filling bulb where at least said upper portion of said dispensing tank is disposed within and enclosed by the filling bulb;
a source of said liquid for said dispensing tank where said source is disposed below said tank;
an isolation pipe disposed between a lower portion of said filling bulb and said liquid source where said isolation pipe has an intermediate portion which is at a lower elevation than the inlet and outlet thereof and where said isolation pipe is disposed above said liquid source;
a compressed air source;
means for filling said tank from said liquid source through said isolation pipe and said filling bulb until the liquid reaches said predetermined level in the dispensing tube and the filling bulb;
means for withdrawing the liquid from the filling bulb whereby liquid will remain in (a) the dispensing tank and its associated dispensing tube and (b) the isolation pipe; and means for supplying said compressed air to said dispensing tank to dispense the liquid remaining in said dispensing tank and the dispensing tube
whereby, during said filling of the dispensing tank, any air in the tank is forced through the dispensing tube and the vent tube to eliminate the formation of air bubbles.

14. A device as in claim 13 where said source of liquid is a reservoir whereby the amount of liquid dispensed is not dependent on the level of the liquid in the reservoir due to the isolation pipe disposed between the bulb and the liquid source.

15. A device as in claim 13 where said liquid source comprises a supply pipe filled with water under sufficient pressure to fill the dispensing tank.

16. A device as in claim 15 including an overflow means disposed on the supply pipe above said predetermined level and below the highest level the liquid reaches in the dispensing tube to permit overflow from said supply pipe if the level of the liquid reaches the elevation of the overflow means and thus prevent overflow from the dispensing tube is the liquid in the supply pipe reaches the level of the overflow means.

17. A device as in claim 13 including a regulation tank disposed between said isolation pipe and said source where the isolation pipe is connected to a lower portion of the regulation tank.

18. A device as in claim 17 including an overflow means disposed on the regulation tank above said predetermined level and below the highest level the liquid reaches in the dispensing tube to permit overflow from said supply regulation tank if the level of the liquid reaches the elevation of the overflow means and thus prevent overflow from the dispensing tube if the liquid in the regulation tank reaches the level of the overflow means.

19. A device as in claim 17 including detecting means disposed in the regulation tank for determining when the liquid reaches said predetermined level and means for stopping the filling of the liquid in response to the detecting means determining the liquid has reached the predetermined level.

20. A device as in claim 13 including detecting means for determining when the liquid reaches said predetermined level and means for stopping the filling of the liquid in response to the detecting means determining the liquid has reached the predetermined level.

21. A device as in claim 20 where said detecting means is disposed in said filling bulb.

22. A device as in claim 13 where said means for supplying the compressed air includes an air distributor actuable to at least two positions where at the first of said positions compressed air is applied to the liquid source to effect said filling of the dispensing tank and at the second position said compressed air effects said dispensing of the liquid.

23. A device as in claim 13 where said means for supplying compressed air includes an air distributor having a plurality of outlet ports adapted for respective connection to a plurality of said dispensing devices.

24. A device as in claim 23 where one of said ports is a reference port and said device includes means for establishing the reference port as the output each time the air distributor is initially operated.

* * * * *